United States Patent [19]

DeStephanis

[11] 4,059,277
[45] Nov. 22, 1977

[54] STYLUS ARM LIFTING/LOWERING APPARATUS FOR A VIDEO DISC PLAYER SYSTEM

[75] Inventor: Ralph DeStephanis, Middlesex, N.J.

[73] Assignee: RCA Corporation, New York, N.Y.

[21] Appl. No.: 667,387

[22] Filed: Mar. 16, 1976

[30] Foreign Application Priority Data

Sept. 15, 1975 United Kingdom ............... 37849/75

[51] Int. Cl.² ............................ G11B 9/06; G11B 3/02
[52] U.S. Cl. .................................... 274/23 A; 274/37; 358/128
[58] Field of Search .................. 274/23 R, 23 A, 23 B, 274/37, 38; 178/6.6 R, 6.6 A, 6.6 DD; 358/128

[56] References Cited

U.S. PATENT DOCUMENTS

| | | | |
|---|---|---|---|
| 3,272,514 | 9/1966 | Heyerdahl | 274/23 R |
| 3,952,145 | 4/1976 | Allen | 274/37 |

*Primary Examiner*—Steven L. Stephan
*Attorney, Agent, or Firm*—Eugene M. Whitacre; William H. Meagher; Dilip A. Kulkarni

[57] ABSTRACT

A video disc system includes an apparatus for lifting and lowering a stylus arm carrying a stylus. A permanent magnet embedded in a movably mounted element is repelled by an electromagnet to effect lowering of the stylus on a record rotatably disposed on a turntable of the video disc system. A selectively operated circuit is provided to control the rate of increase of voltage across the coil to obtain a smooth landing of the stylus on the record for playback.

5 Claims, 9 Drawing Figures

STYLUS ARM LIFTING/LOWERING APPARATUS FOR A VIDEO DISC PLAYER SYSTEM

The present invention relates to a video disc player, and more particularly, relates to an apparatus for lifting and lowering a stylus arm.

In a video disc system of the type described in U.S. Pat. No. 3,842,194, it is advantageous to effect a smooth landing of the stylus on the record for playback — for example, for protecting the signal elements recorded in the groove bottom, the walls of the record groove, and the stylus.

For lowering of the stylus arm to establish stylus/record contact, one may utilize a conventional magnetic relay in conjunction with a movable iron core To obtain a controlled acceleration of the movable iron core in such an arrangement, a device such as a dashpot is required which increases the mass of the moving system. Such an arrangement is undesirable because of added cost, power consumption, etc.

In a record playback system, including a stylus arm carrying a stylus at one end and pivotally secured to a support member of the playback system at its other end, an apparatus for lifting and lowering the stylus arm is provided in accordance with the principles of the present invention. A movable element, including a permanent magnet, is secured to the support member for movement between a first location and a second location. A stylus arm rest is secured to the movable element for engagement with the stylus arm. The configuration of the stylus arm rest is such that the stylus arm rest occupies (a) an elevated position when the movable element is in the first location, and (b) a depressed position when the movable element is in the second location. Th stylus arm rest in the elevated position supports the stylus arm in a manner precluding stylus/record contact. The location of a stationary element is such that the permanent magnet is located in close proximity to an electromagnet secured to the stationary element. Selectively operated means energizes the electromagnet to move the permanent magnet from one of its two positions to the other.

Pursuant to another feature of the invention, the selectively operated means is effective to provide a controlled excitation of the electromagnet to effect a gradual lowering of the stylus on the record for playback.

Figure 1:
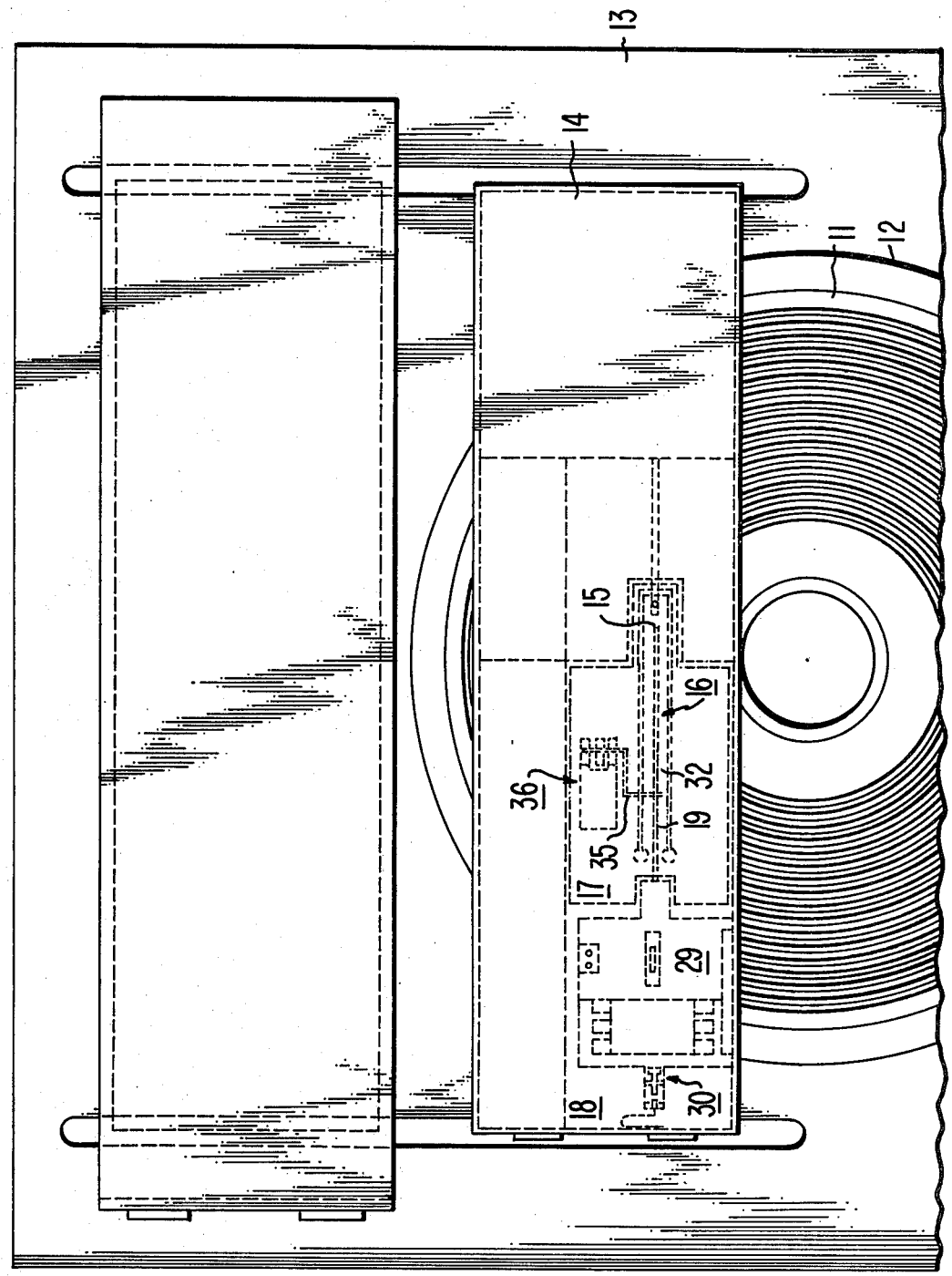
FIG. 1 is a plan view of a video record player incorporating an apparatus for lifting and lowering a stylus arm carrying a stylus, pursuant to the principles of the present invention.

In FIG. 1, numeral 10 indicates a video disc player of the general type shown in the U.S. Pat. No. 3,842,194 (Clemens). A record 11 is rotatably mounted for playback on a turntable 12 secured to a motorboard 13 of the player. A stylus housing 14 is mounted for lateral motion relative to the motorboard 13 in correlation with lateral motion of a stylus 15 riding in a spiral groove disposed on the surface of the disc record 11 during playback. Reference may be made to the U.S. Pat. No. 3,870,835 (Stave) for illustration of an apparatus or laterally driving the stylus housing 14 during playback.

A stylus arm unit 16 is housed in a cartridge 17. The cartridge 17 is received in a compartment 18 provided in the stylus housing 14.

Figure 2:
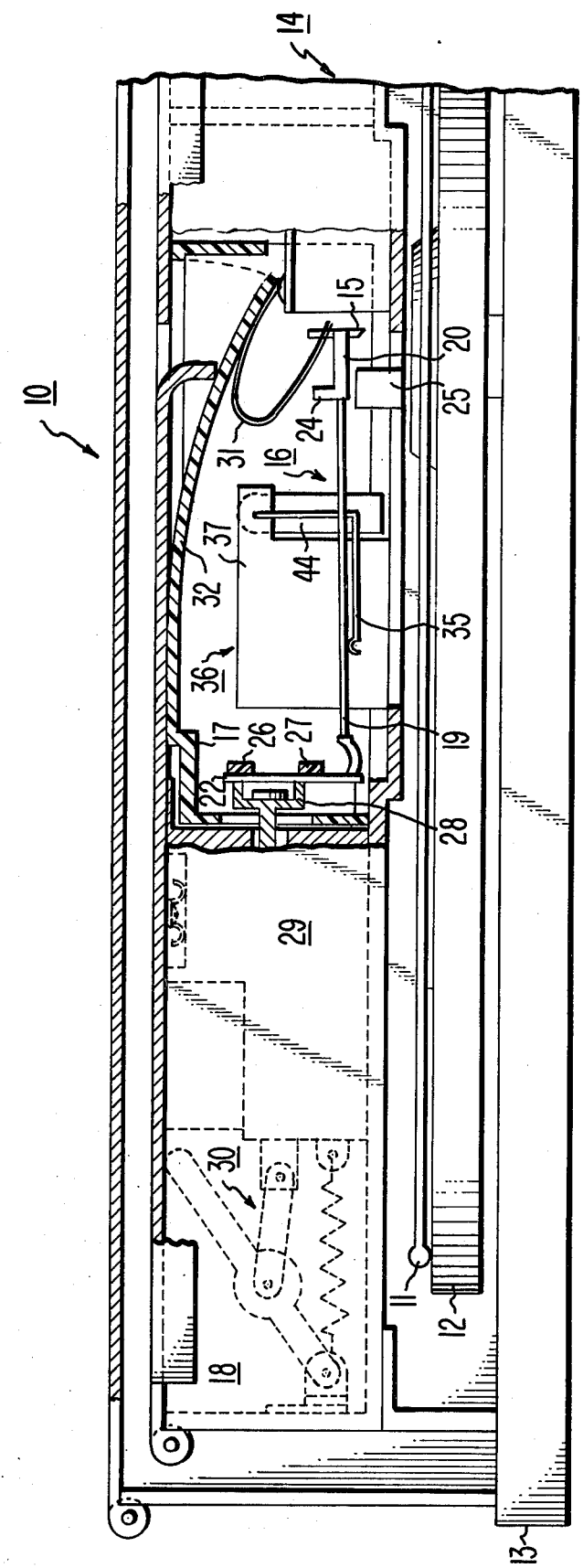
FIG. 2 is an end view of the video record player illustrating a stylus arm rest of the apparatus of FIG. 1 supporting the stylus arm in a manner precluding stylus/record contact.
Figure 3:
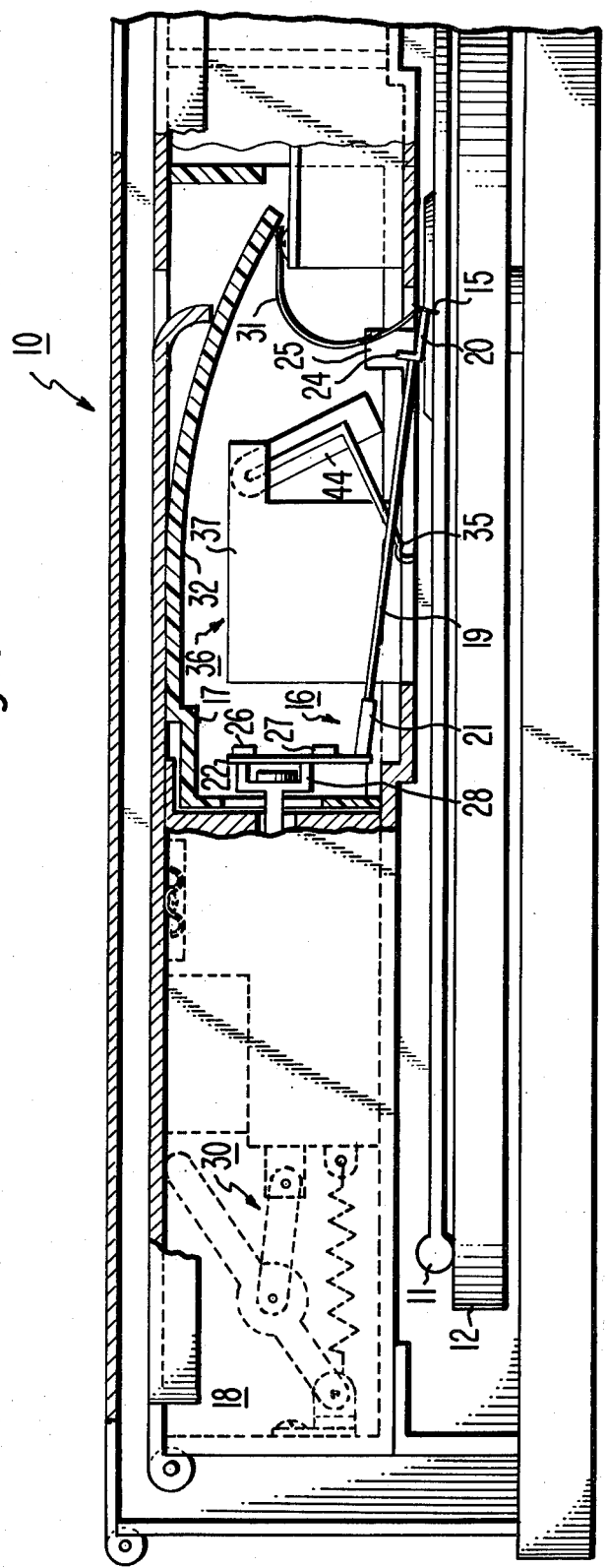
FIG. 3 is another end view of the video record player illustrating the stylus arm rest of FIG. 2 depressed to a position lower than that required for recordsupported stylus arm.
Figure 4:
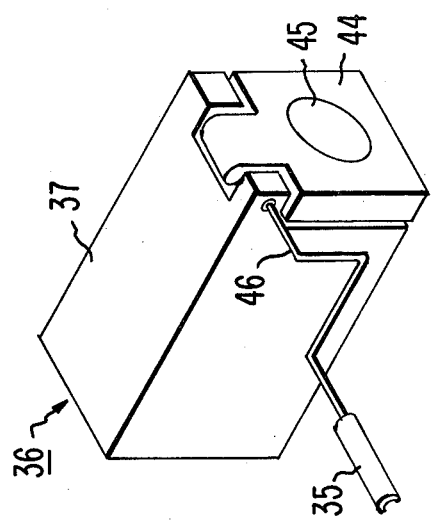
FIGS. 4–7 illustrate, respectively, a perspective view, an end view, a top view, and a front view of the apparatus of FIGS. 1–3.
Figure 7:
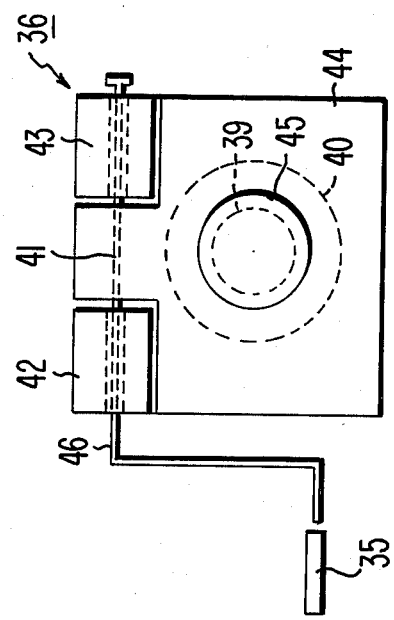
Figure 5:
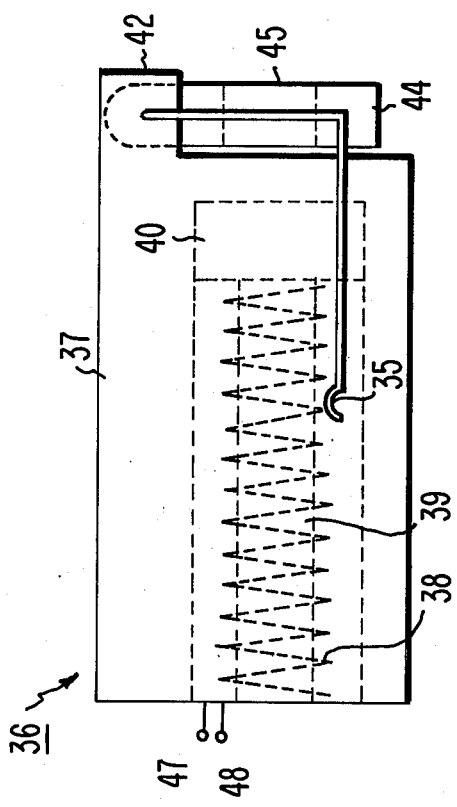
Figure 6:
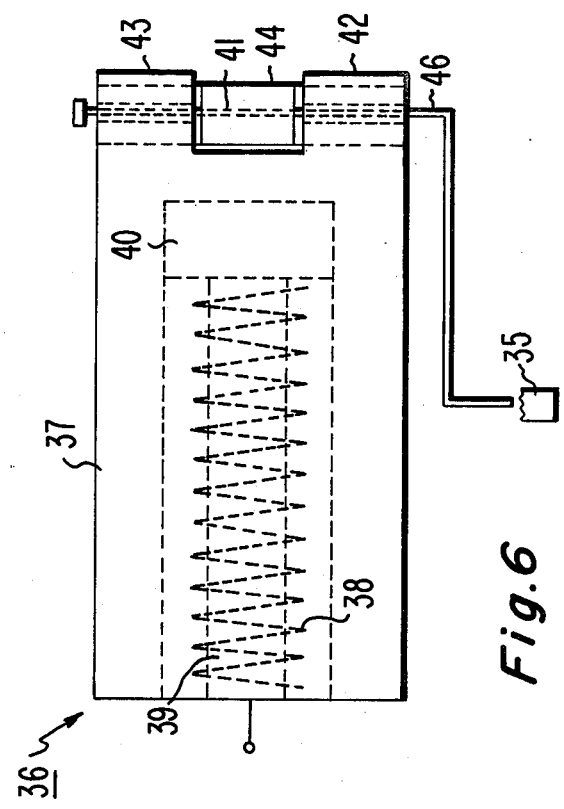

As can be seen from FIGS. 2 and 3, the stylus arm unit 16 comprises a stylus arm 19 formed with an aluminum tube (e.g., 0.024 inch outer diameter and 0.002 inch thickness) with a plastic stylus holder 20 insert molded at one end of the stylus arm and a compliant member 21 insert molded at the other end of the stylus arm. The compliant member 21 is in substantially unstressed condition when it is aligned with the stylus arm 19. A connector plate 22 is glued to the compliant member 19 in a manner that establishes a 94° angle therebetween. The plastic stylus holder 20 contains a slot in which the stylus 15 is glued in place. A small projection 24 is molded at the top of the plastic stylus holder 20 to engage with a "stone wall" 25 to relieve the stylus 15 from a locked groove.

The conductor plate 22 is flexibly suspended in the cartride 17 by a pair of elastic straps 26 and 27. The elastic straps 26 and 27 laterally align the connector plate 22 for rigid engagement with a support element 28 when the cartridge 17 is received in the stylus housing 14. The support element 28 is subjected to cyclical motion by an armstretcher 29 in a manner that opposes variation in stylus/record relative speed from a predetermined speed. After the cartridge 17 is placed in the support housing compartment 18, a linkage 30 moves the armstretcher 29 forward to effect a rigid engagement between the support member 28 and the connector plate 22.

The cartridge 17 further includes a leaf spring 31, in the form of a ribbon, for urging the stylus 15 in the record groove during playback. One end of the leaf spring 31 is secured to the stylus 15. The outer end of the leaf spring 31 is secured to the free end of a cantilever beam 32. Slots in the top wall of the cartridge 17, as shown in FIG. 1, allow a strip-like portion of the top wall of function as the cantilever beam 32.

The location of the free end of the cantilever beam 32 with respect to the bottom surface of the cartridge 17, and the configuration of the leaf spring 31 is such that the stylus arm is held in a retracted position in the cartridge of protection. The retracted position provides a location for the stylus 15 withdrawn within the confines of the cartridge 17 remote from an opening in the bottom surface of the cartridge through which the stylus protrudes when the stylus housing 14 overlies the record 11 for playback as shown in FIG. 3.

When a lid 33 of the stylus housing 14 is closed during containment of the cartridge 17 in the stylus housing compartment 18, a defeat lever 34 secured to the stylus housing lid depresses the free end of the cantilever beam 32 to lower the stylus arm 19 on a stylus arm rest 35 of a stylus arm lifting/lowering apparatus 36. The cartridge 17 has a compartment which overlies the stylus arm lifting/lowering apparatus during containment of the cartridge in the stylus housing compartment 18.

FIGS. 4–7 illustrate a perspective view, an end view, a plan view, and a front view of the stylus arm lifting/lowering apparatus 36. The principle of magnetic repulsion of like poles is utilized to effect depression of the stylus arm rest 35 when the stylus housing 14 overlies the record to cause a gradual lowering of the stylus on the record 11 for playback.

The illustrated mechanism includes a structure 37 for an electromagnet formed by a coil 38, wound about an iron core 39 having a forward projecting pole piece 40. A pivot pin 41 extends through registered openings in spaced projections 42, 43 of the forward end of the structure 37 with sufficient clearance to permit rotation of the pivot pin in the openings. Secured to the pivot pin 41, between the projections 42, 43 is a plastic member 44 in which is embedded a permanent magnet 45. An extension 46 of the pivot pin 41 protrudes from one side of the structure 37. The stylus arm rest 35 is secured to the extension 46.

The pivot point for the plastic member 44 is so located that (in the absence of energization of the electromagnet) the weight of the magnet 45 causes the plastic member 44 to assume a downward extending position (i.e., rest position) in which the plastic member 44 abuts the forward end of the structure 37, with the permanent magnet 45 lying in close proximity to the pole piece 40. Under these conditions, the stylus arm rest 35 occupies the elevated position as illustrated in FIG. 2.

When, however, the coil 38 is energized with current of a polarity causing the pole piece 40 to assume the sampe poling as the proximate face of the permanent magnet 45, the force of repulsion between like poles causes the plastic member 44 to pivot away from the downward extending position of abutment with the forward end of the structure 37, with the amount of rotation of the plastic member being dependent upon the magnitude of the current in the coil 38. An illustrative repelled position for the plastic member 44 and the resultant depressed position for the stylus arm rest 35 is shown in FIG. 3. The depressed position of the stylus arm rest 35 is desirably lower than that required to achieve stylus/record contact, whereby the stylus arm 19 is freed from contact with the stylus arm rest.

Figure 9:
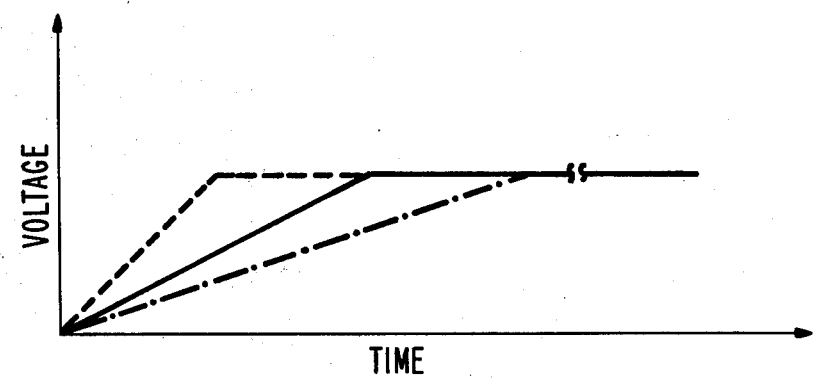
FIG. 9 illustrates the controlled excitation provided by the selectively operated circuit of FIG. 8.

As illustrated in FIG. 2, when the plastic member 44 is in its rest position, the stylus arm rest 35 supports the stylus arm 19 in an elevated position precluding stylus/record contact. Upon energization of the coil 38, the pivoting away of the plastic member 44 effects a lowering of the stylus arm 19, as shown in FIG. 3. The use of a magnetic repulsion technique facilitates achievement of a smooth stylus arm lowering action, and readily avoids undesired acceleration of the stylus as impact on the record is about to be achieved. By control of the onset of coil energization, when stylus arm lowering is desired, as by use of a ramp rise of the voltage applied across the coil 38 of an appropriate slope (e.g., FIG. 9), accurate control of the speed of stylus lowering is achievable.

An illustrative circuit for providing an adjustable ramp increase in the voltage (e.g., FIG. 9) across the terminals 47 and 48 of the coil 38 will now be described with reference to FIG. 8.

Figure 8:
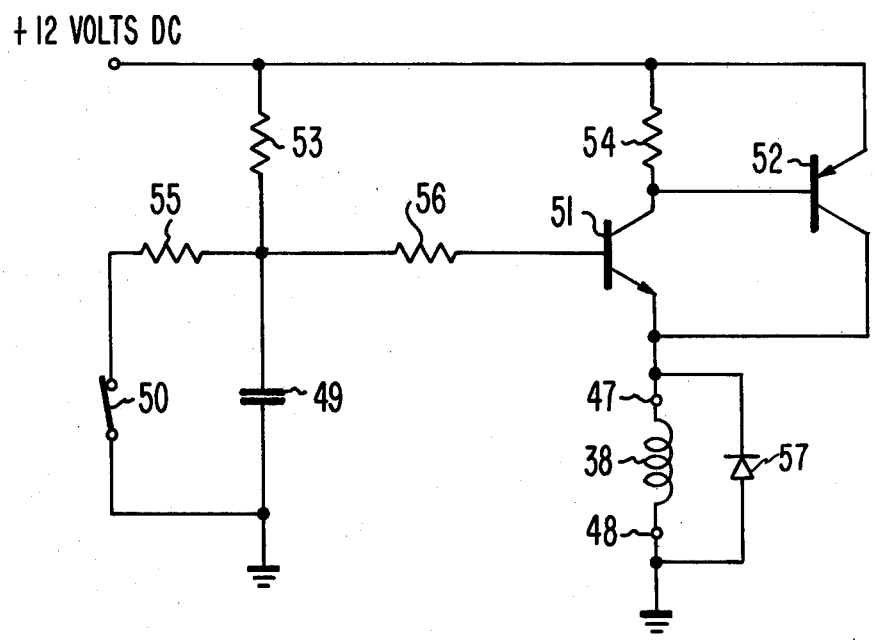
FIG. 8 is a selectively operated circuit for providing a controlled exictation of an electromagnet included in the apparatus of FIGS. 1–7.

In the circuit of FIG. 8, the series combination of a resistor 53 and a capacitor 49 is connected between a positive potential supply terminal and a point of reference (e.g., ground) potential. A switch 50, when closed, serves to shunt a resistor 55 across the capacitor 49. The junction of resistor 53 and capacitor 49 is connected via a resistor 56 to the base of an NPN transistor 51. The electromagnet winding 38 is connected between the emitter of transistor 51 and the point of reference potential, while a resistor 54 is connected between the collector of transistor 51 and the positive potential supply terminal. A PNP transistor 52 is disposed with its base directly connected to the collector of transistor 51, its emitter directly connected to the positive potential supply terminal, and its collector directly connected to the emitter of transistor 51. A diode 57 is shunted across winding 38, with the diode cathode connected to the emitter of transistor 51, and with the diode anode connected to the point of reference potential.

The resistance value of resistor 55 is selected to be sufficiently small relative to the resistance value of resistor 53 so that while switch 50 is maintained closed, the potential at the resistor-capacitor junction is insufficient (e.g., 12 millivolts) to permit turn-on of transistor 51. In the absence of conduction by transistor 51, transistor 52 is likewise held in a cut-off state. Under these conditions, energizing current does not flow through the electromagnet winding 38.

However, when switch 50 is selectively opened, the shunting resistor 55 is effectively removed from the circuit. Charging of capacitor 49 through resistor 53 causes the potential at the resistor-capacitor junction to rise toward the supply potential (e.g., +12 volts) at a rate primarily determined by the time constant of the resistor 53 — capacitor 49 combination. As the junction potential rises, the base-emitter junction of trnsistor 51 becomes forwardly biased, rendering transistors 51 and 52 conducting to cause the flow of energizing current through the electromagnet winding 38. The energizing potential across winding 38 follows the rising junction potential to effect a smoothly rising increse in the energizing current. The slope of the ramp rise in energizing potential may be varied, as illustrated by the differentialy sloped ramp waveforms of FIG. 9, by varying the charging time constant (e.g., by varying the value of resistor 53) to control the stylus lowering rate.

When a re-elevation of the stylus is desired, a re-closing of switch 50 effects a rapid discharge of capacitor 49 (the discharging time constant being determined by the values of capacitor 49, and resistor 55) to quickly raise the stylus. Diode 57 precludes the development of a large amplitude negative pulse across winding 38, when the energizing current magnitude suddently drops.

By controlling the onset of the coil energization, a controlled rate of lowering of the stylus arm is obtained to provide a smooth landing of the stylus on the record for playback. The use of a magnet repulsion effect, in contrast with a magnet attraction effect, in achieving arm rest lowering, is advantageous for control of stylus landing speed, because, as repulsion proceeds, the increase in separation between the permanent magnet and the electromagnet imposes a requirement of increase in electromagnet energization for further motion.

While in the illustrated embodiment, the weight of the plastic member 44 and the permanent magnet 45 is utilized to bias the stylus arm rest 35 in the elevated position in the absence of the energization of the coil 38 (FIG. 2), one may alternatively use other biasing devices (e.g., a spring). Reference may be made to a copending U.S. application, Ser. No. 667,309, of M. A. Leedom, et al., entitled, "STYLUS ARM LIFTING/LOWERING APPARATUS FOR A VIDEO DISC PLAYER," filed concurrently herewith, for illustration of a modification of the above-described system for obtaining a smooth landing of the stylus on the record, wherein a spring biasing device is employed. The Leedom, et al., application is assigned of record to the assignee of the instant application. It will be noted that the apparatus 36 protects the stylus 15 from damage in the event of a failure of the power supply of the video disc player 10. If the power supply fails, the stylus arm rest 35 is effective to raise the stylus 15 away from the record 11 because the stylus arm rest is biased to occupy the elevated position in the absence of coil energization.

What is claimed is:

1. In a system for playing back prerecorded signals from a spirally grooved record disposed on a turntable rotatably mounted with respect to a base of said playback system; said system including a support member and a stylus arm; said stylus arm carrying a groove-riding stylus at one end thereof and being pivotally secured at the end thereof, remote from said one end, to said support member; an apparatus comprising:
   1. a movable element secured to said support member for movement between a first location and a second location; said movable element including a permanent magnet;
   2. a stylus arm rest secured to said movable element subject to engagement with said stylus arm in a region thereof remote from said pivoted end of said stylus arm;
   the configuration of said stylus arm rest being such that said stylus arm rest occupies (a) an elevated position when said movable element is in said first location, and (b) a depressed position when said movable element is in said second location;
   said stylus arm rest in said elevated position supporting said stylus arm in a manner precluding stylus/record contact;
   said stylus arm rest in said depressed position permitting said stylus arm to establish said stylus/record contact when said stylus overlies said record for playback;
   3. a stationary element secured to said support member; said stationary element including means for generating magnetic flux;
   the location of said stationary element being such that said permanent magnet is located in proximity to said magnetic flux generating means when said stylus arm rest is in said elevated position; and
   4. selectively operated means for providing a given polarity of energization of said magnetic flux generating means; and
   wherein the orientation of said permanent magnet relative to said magnetic flux generating means is such that said permanent magnet is repelled away from said magnetic flux generating means during said energization of said given polarity; the repulsion of said permanent magnet causing motion of said stylus arm rest from said elevated position to said depressed position.

2. A system as defined in claim 1 wherein said support member comprises a stylus arm carriage mounted for lateral motion in correlation with lateral motion of said groove-riding stylus during playback.

3. An apparatus as defined in claim 2 wherein said selectively operated means causes said energization of said magnetic flux generating means when said stylus arm carriage overlies said record to lower said stylus arm to establish stylus/record contact for playback.

4. An apparatus as defined in claim 2 wherein said magnetic flux generating means comprises a coil wound about a magnetizable core; said selectively operated means being effective to cause a unidirectional controlled current to flow through said coil to provide said energization; said magnetizable core having a pole piece; said location of said stationary element being such that a pole of said permanent magnet is situated in close proximity to said pole piece when said movable element is in said first location; the polarity of said pole of said permanent magnet being the same as the polarity of said pole piece in the presence of said unidirectional controlled current in said coil to effect said repulsion of said permanent magnet.

5. An apparatus as defined in claim 4 wherein said movable element is fixedly secured to a pivot pin having an axis which is offset from said permanent magnet; wherein said stationary element includes means for permitting adjustable rotation of said pivot pin such that said pole of said permanent magnet is located in close proximity with said pole piece of said magnetizable core in the absence of said unidirectional controlled current in said coil; wherein said stylus arm rest is secured to said pivot pin such that said stylus arm rest is substantially parallel to, and offset from, said pivot pin; wherein said securing of said stylus arm rest to said pivot pin serves (1) to locate said stylus arm rest in said elevated position while said coil remains deenergized, and (2) to locate said stylus arm rest in said depressed position while said coil remains energized.

* * * * *

UNITED STATES PATENT OFFICE
CERTIFICATE OF CORRECTION

PATENT NO. : 4,059,277

DATED : November 22, 1977

INVENTOR(S) : RALPH DeSTEPHANIS

It is certified that error appears in the above-identified patent and that said Letters Patent are hereby corrected as shown below:

Column 2, line 56      Change "of" to --for--

Column 3, line 33      Change "sampe" to --same--

Column 4, line 37      Change "increse" to --increase--

Column 4, line 49      Change "suddently" to --suddenly--

Signed and Sealed this

Twenty-first Day of November 1978

[SEAL]

Attest:

RUTH C. MASON
Attesting Officer

DONALD W. BANNER
Commissioner of Patents and Trademarks